(12) United States Patent
Wachel

(10) Patent No.: US 6,795,933 B2
(45) Date of Patent: Sep. 21, 2004

(54) NETWORK INTERFACE WITH FAIL-OVER MECHANISM

(75) Inventor: Robert D. Wachel, Altadena, CA (US)

(73) Assignee: Intel Corporation, Santa Clara, CA (US)

( * ) Notice: Subject to any disclaimer, the term of this patent is extended or adjusted under 35 U.S.C. 154(b) by 501 days.

(21) Appl. No.: 09/738,012

(22) Filed: Dec. 14, 2000

(65) Prior Publication Data

US 2002/0078395 A1 Jun. 20, 2002

(51) Int. Cl.[7] ................................................. G06F 11/00
(52) U.S. Cl. ............................... 714/4; 714/43; 370/216
(58) Field of Search ........................ 714/4, 43; 370/216

(56) References Cited

U.S. PATENT DOCUMENTS

| | | | |
|---|---|---|---|
| 6,052,733 A | * | 4/2000 | Mahalingam et al. ....... 709/235 |
| 6,108,300 A | * | 8/2000 | Coile et al. ................. 370/217 |
| 6,308,282 B1 | * | 10/2001 | Huang et al. .................. 714/4 |
| 6,314,525 B1 | * | 11/2001 | Mahalingham et al. ........ 714/4 |
| 6,542,934 B1 | * | 4/2003 | Bader et al. ................ 709/239 |

* cited by examiner

Primary Examiner—Robert Beausoliel
Assistant Examiner—Christopher S McCarthy
(74) Attorney, Agent, or Firm—Kevin A. Reif

(57) ABSTRACT

A method of improving network interface reliability uses a fail-over mechanism. When one network card becomes disabled, a second network card takes its place. A mid-plane separates the network card into a transition portion and a main portion. Cables are connected to the transition portion, and allows input and output from a particular network card to be re-routed to another network card without the need to physically alter the external cables.

10 Claims, 6 Drawing Sheets

NETWORK INTERFACE WITH FAIL-OVER MECHANISM

BACKGROUND OF THE INVENTION

1. Field of the Invention

The described invention relates to the field of network communications. In particular, the invention relates to a method for improving reliability of a network system by using a fail-over mechanism that employs redundant network cards.

2. Description of Related Art

In a typical chassis system, numerous circuit boards are plugged into the backside of the chassis. Network connections are attached either directly to network communication circuit boards ("network cards") or to the front of the chassis where the connectors allow signals to be passed through the chassis to network circuit cards inside.

Replacing a failed network card in a system may take a significant amount of time and may cause unacceptable service interruptions to customers. Additionally, the replacement process may involve removing various attached cables, fitting the replacement board, and reattaching the network cables properly. This gives rise to the possibility of wiring errors, which can further interrupt network service.

DETAILED DESCRIPTION

Figure 1:
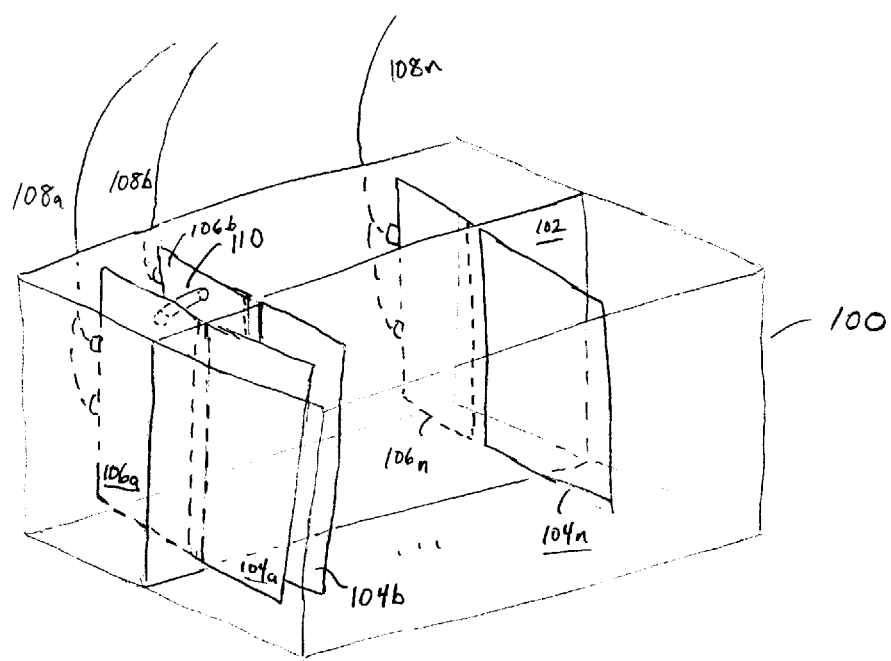
FIG. 1 is an exemplary midplane system having a chassis with transition and main network cards.

One architecture that allows easier replacement of network cards uses a midplane system as shown in FIG. 1. In particular, chassis 100 contains midplane 102. Midplane 102 is a circuit board that provides jacks for plug-in cards such as main cards 104a–n and transition cards 106a–n to plug into. Unlike a standard chassis system in which all cables are passed through the chassis directly to the network card, a midplane system uses transition cards that allow for easy loading and removal of network (main) cards without having to tamper with the cabling and the assembly of the system.

Main cards 104a–n contain active electrical components, such as the processing engines, and have a higher failure rate than passive components. Conversely, transition cards 106a–n contain primarily passive electrical components (e.g., resistors, capacitors, inductors) and mostly provide Input/Output (hereinafter I/O) termination; transition cards have a lower failure rate than the main cards. This deliberate separation of functionality is an attempt to maintain a high level of fault tolerance for the midplane system. More specifically, replacing a transition card 106a–n likely involves reconfiguring I/O and rearranging physical cabling, which are both time-consuming and susceptible to errors. Therefore, implementing a transition card 106a–n with a low failure rate is likely to result in infrequent changes of the card and a reduced probability of encountering undesirable delays and errors that are associated with the card changes. On the other hand, unlike a transition card 106a–n, swapping out a main card 104a–n does not involve the mentioned reconfiguration and rearrangement. Thus, placing core processing on an easily exchangeable network communication card, such as main card 104a–n, helps to avoid disrupting operations of the midplane system.

Referring to FIG. 1, a transition card 106a is coupled to network I/O 108a via cable interfaces. Transition card 106a is also coupled to main card 104a via the midplane 102 which allows I/O signals to be passed through from one side to the other. Midplane 102 may also allow signals to be routed to other transition or main cards plugged in to the chassis 100. In one embodiment, connectors 110 between transition cards may also be employed so that common signals are provided to multiple transition cards. Similarly, transition card 106b is coupled to network I/O 108b and to main card 104b via the midplane 102, and so forth.

In one embodiment, each of the main cards 104a–n communicate via a Compact PCI (cPCI) bus. (The cPCI specification is published by the PCI Industrial Computers Manufacturer's Group.) The cPCI bus allows the main cards to be hot-swapped, i.e., removed and replaced without the need to power down the chassis 100.

Figure 2:
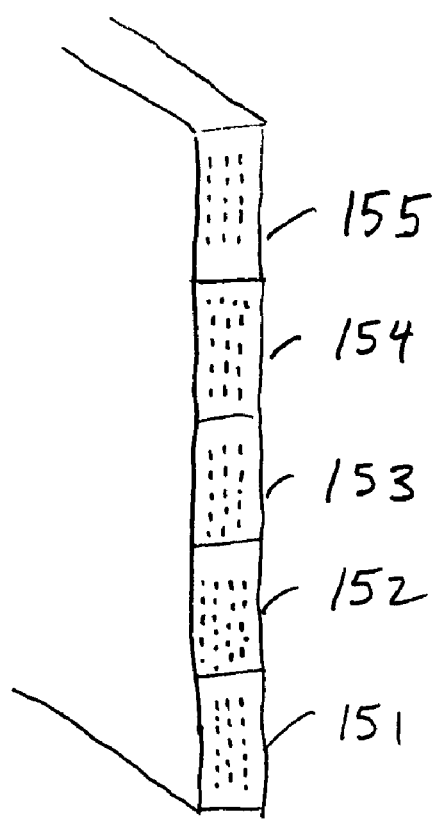
FIG. 2 is an exemplary edge connector of a network card for plugging into the midplane.

FIG. 2 shows an exemplary edge connector of a main card for plugging into the midplane. In one embodiment, the connector comprises five sets of I/O pins for providing various I/O signals. Referring to FIG. 2, a first set of pins 151 provides the signals for a 32-bit cPCI bus. A second set of pins 152 provides the signals for a 64-bit extension to the cPCI bus. A third set of pins 153 allow I/O signals to pass through the midplane from transition cards to corresponding main cards. This set of signals 153 can be used for Ethernet signals, or can be custom-defined between the transition board and the main board. A fourth set of signals 154 allows a second bus to be used to communicate with other network (main and/or transition cards) cards via the midplane. For example, a computer telephony bus such as H.110 may be employed. A fifth set of pins 155 also allows I/O signals to pass through the midplane from transition cards to corresponding main cards. In one embodiment, tip and ring signals are passed through the fifth set of pins 155. In one embodiment, a transition card is coupled to its main card through the third, fourth, and fifth set of pins (153–155) described above.

Figure 3:
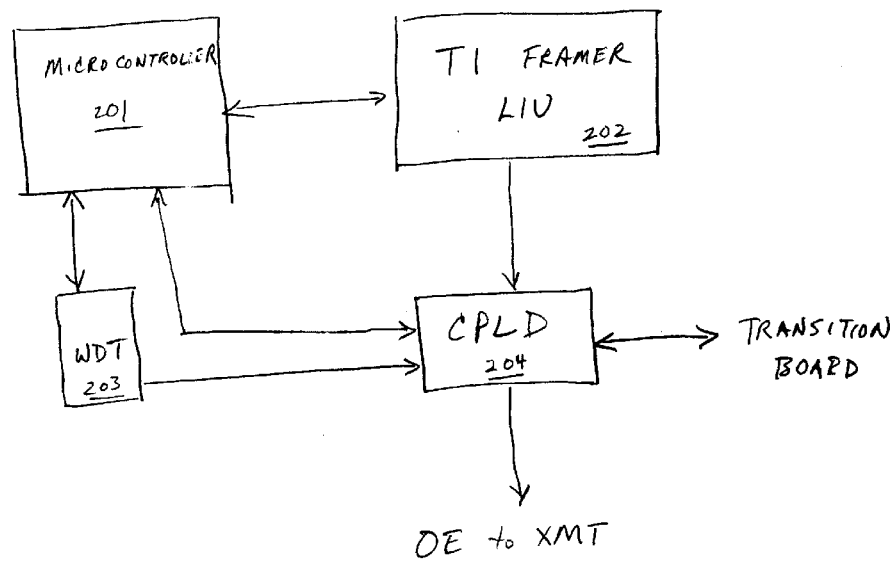
FIG. 3 is a block diagram showing components on a main network card.

FIG. 3 is a block diagram showing exemplary components on a main network card. In one embodiment, a microcontroller 201 is coupled to a T1 Framer Line Interface Unit (LIU) 202 to provide processing and network functionalities. The T1 protocol (also called DS1) is specified by the American National Standards Institute (latest revision T1.403.00, 403.01, 403.02—1999). A watch dog timer (WDT) 203 is coupled to the microcontroller 201. The microcontroller 201 programs the WDT 203 to a predetermined reset value, then starts the WDT 203 counting down. The microcontroller 201 then periodically resets the WDT 203 so that it starts counting down from the reset value again. If a problem occurs preventing the microcontroller 201 from resetting the WDT 203 such that the WDT 203 counts all the way down to zero, then the WDT 203 signals that an error occurred. In one embodiment, when the WDT 203 times out, it signals a failure to the microcontroller 201 as well as a logic device such as Complex Programmable Logic Device (CPLD) 204.

When the CPLD 204 detects a failure, e.g., from the time out of the WDT 203, the CPLD 204 sends a fail signal to its transition board. The CPLD 204 also disables its own transmitter by turning off the Output Enable (OE) to the main card's transmitter (not shown), and the CPLD 204 sends a fail signal to the microcontroller 201.

Figure 4:
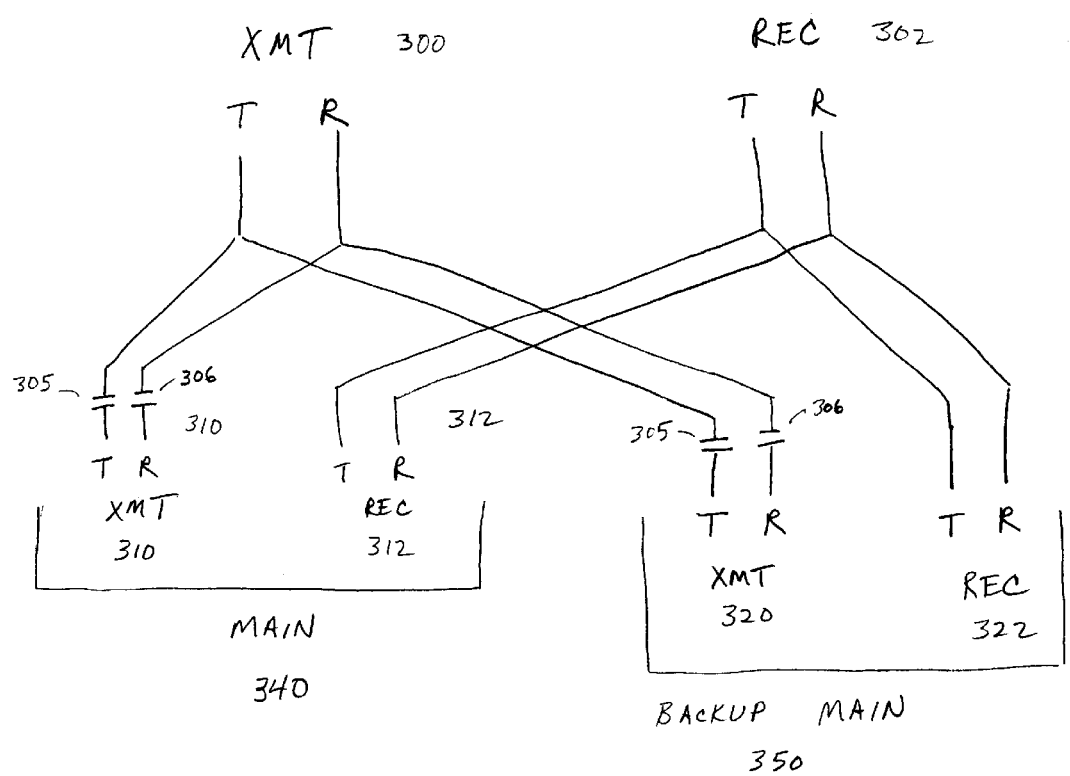
FIG. 4 shows a schematic diagram of I/O signals coupled to a first main card and its associated backup main card.

FIG. 4 shows a schematic diagram of I/O signals coupled to a first main card 340 and its associated backup main card 350. In one embodiment, the backup main card 350 is dedicated as a backup solely for main card 340. For example, main card 104b can be a dedicated backup card for main card 104a, main card 104d can be the backup card for main card 104c, and so forth.

Referring to FIG. 4, the transmitted signals 300, i.e., the I/O signals that are transmitted out of the chassis, have a tip and a ring component. In one embodiment, the tip component of transmitted signals 300 is coupled via capacitors 305 to both the tip component of the main card's transmitter 310 and the tip component of the backup main card's transmitter 320. Similarly, the ring component of transmitted signals 300 is coupled via capacitors 306 to both the ring component of the main card's transmitter 310 and the ring component of the backup main card's transmitter 320.

The received signals 302, i.e., the I/O signals that are received into the chassis, also have tip and ring components. The tip component of the received signals 302 is coupled directly to the tip components of the main card's receiver 312 and to the tip component of the backup main card's receiver 322. The ring component of the received signals 302 is coupled directly to the ring component of the main card's receiver 312 and to the ring component of the backup main card's receiver 322. No capacitor is needed to couple the received signals 302 to the receivers 312/322 of the main card 340 and the backup main card 350.

In one embodiment, passive components such as capacitors 305 and 306 are placed on the transition cards and the active components such as transmitters and receivers are implemented on the main cards. A synchronous clock is provided to both the main card and the backup main card. Network I/O cables need not be redundantly attached to multiple circuit boards of the chassis since the network I/O signals can be routed internally through the chassis either via the midplane or via connectors coupling the transition boards together. With the circuitry configured as in FIG. 4, a dedicated backup main card is able to operatively mimic the main card since it receives the same inputs. The backup main card's output is simply disabled through the output enable (OE) of the backup main card's transmitter 320. However, when a failure is detected the OE of the main card's transmitter is disabled and the OE of the backup main card's transmitter is enabled. This allows nearly instantaneous swapping of network operations between the main card and the backup main card. For example, on a T1 line, switching is done within a 125 microsecond, which is a small enough delay as to not cause a frame loss error. This dedicated backup architecture is referred to as a 1+1 architecture, i.e., one backup card for each primary main card.

Figure 5:
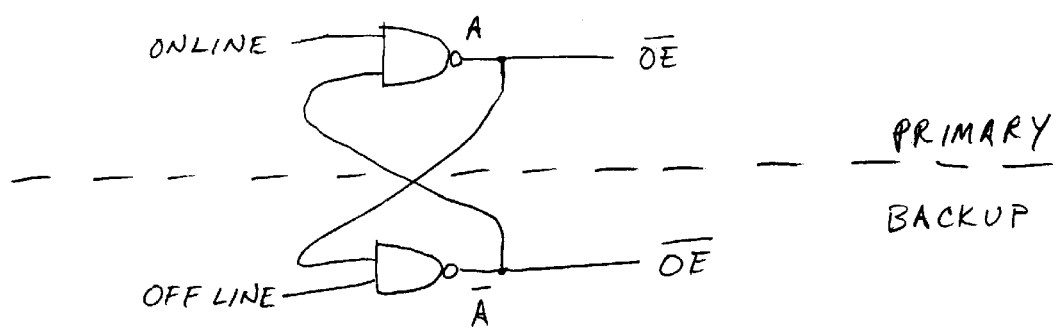
FIG. 5 shows one mechanism for switching between a primary main card and a backup main card.

FIG. 5 shows one mechanism for switching between a primary main card and a backup main card. In one embodiment, the CPLD on the primary main card provides a signal whether the primary main card should be active ("ONLINE", e.g., digital 1) or disabled ("OFFLINE", e.g., digital 0). The backup card's CPLD provides a similar signal. The OE's of the primary main card and its backup card are coupled through a flip-flop circuit such that only one OE is active at a time. In this embodiment, once the primary main card is disabled, the primary main card will not be able to assert its OE again until it is ONLINE again and the backup card is OFFLINE.

In an alternate embodiment, one backup main card 350 serves as backup for multiple main cards. Hardware and software are used to route the appropriate signals from a failed main card to the backup main card 350. However, since it is not known which of the multiple main cards will fail, it not possible for the backup main card to operatively mimic the failed card as in the dedicated backup architecture. Thus, there is a relatively long delay when the backup card 350 takes over for a failed card. In one embodiment, this delay is around the time of one frame sync.

Figure 6:
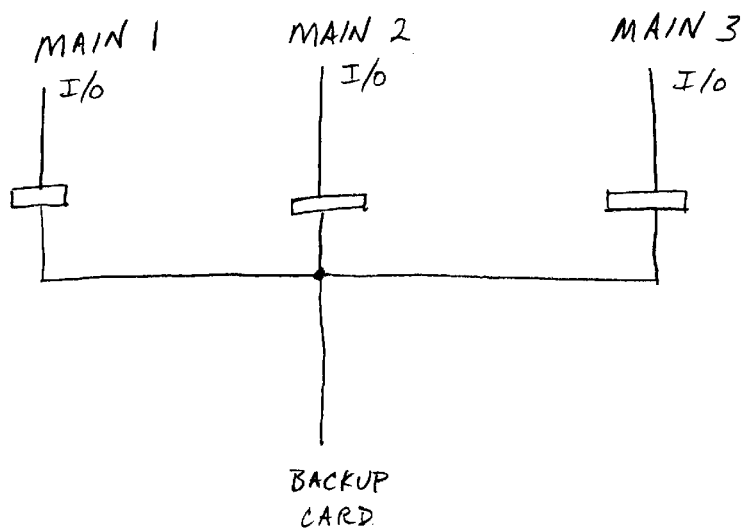
FIG. 6 shows one example of multiple primary main cards providing I/O signals to a common backup main card.

FIG. 6 shows one example of multiple main cards providing I/O signals to a common backup card. In this example, when a failure occurs on a main card, gates on the corresponding transition card enable its I/O signals to pass through to the backup main and transition card. An N+1 architecture has N primary main cards and one backup card.

Figure 7:
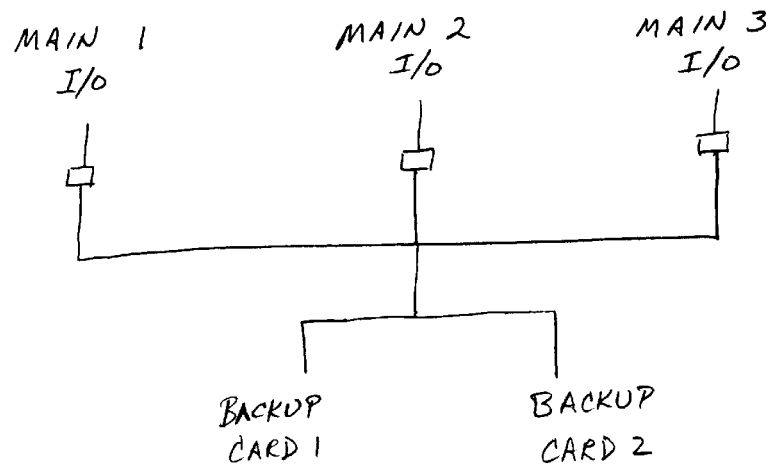
FIG. 7 shows an example of multiple main cards providing I/O signals to multiple backup cards.

FIG. 7 shows an example of multiple main cards providing I/O signals to multiple backup cards. Hardware and software determine which backup card to enable first and route the appropriate I/O signals from a failed main card to the appropriate backup main cards 350. This is called an N+M architecture, where N is the number of primary main cards and M is the number of backup cards.

Thus, a method of improving network reliability has been described. However, the specific embodiments and methods described herein are merely illustrative. Numerous modifications in form and detail may be made without departing from the scope of the invention as claimed below. For example, although the previous description describes an embodiment using a cPCI bus to communicate between the network communication cards, a different communication bus may be employed. Similarly, protocols other than the T1 protocol may be employed. The invention is limited only by the scope of the appended claims.

What is claimed is:

1. A method of improving network reliability comprising:
   routing network I/O signals from external to a chassis to a first network card via a transition network card;
   de-activating the first network card upon detecting a failure of the first network card;
   automatically routing the network I/O signals from the transition network card to a second network card; and
   activating the second network card,
   wherein the de-activating of the first network card and the activating of the second network card occurs within a time that is small enough to not allow a loss of frame error to occur.

2. A method of improving network reliability comprising:
   routing network I/O signals from external to a chassis to a first network card via a transition network card;
   de-activating the first network card upon detecting a failure of the first network card;
   automatically routing the network I/O signals from the transition network card to a second network card;
   activating the second network card;
   activating the replacement network card; and
   de-activating the second network card.

3. The method of claim 2, wherein the network I/O signals are tip and ring signals.

4. The method of claim 3 further comprising:
   receiving a first communication signal originating from outside the chassis; and providing the first communication signal to both the first network card and the second network card.

5. A method of improving network reliability comprising:
routing network I/O signals from external to a chassis to a first network card via a transition network card;
de-activating the first network card upon detecting a failure of the first network card;
automatically routing the network I/O signals from the transition network card to a second network card; and
activating the second network card,
wherein the network I/O signals are routed from the transition network card to the second network card via connectors and a second transition card.

6. A method of improving network reliability comprising:
receiving network I/O signals by a transition card;
providing the network I/O signals from the transition card to a first network card;
detecting a failure in the first network card;
automatically routing the network I/O signals from the transition card to a spare network card;
enabling the spare network card from an inactive state;
hot-swapping the first network card with a replacement network card; and
automatically disabling the spare network card responsive to hot-swapping the first network card with the replacement network card.

7. A method of improving network reliability comprising:
receiving network I/O signals by a transition card;
providing the network I/O signals from the transition card to a first network card;
detecting a failure in the first network card;
automatically routing the network I/O signals from the transition card to a spare network card; and
enabling the spare network card from an inactive state,
wherein providing the network I/O signals from the transition card to the first network card is done by passing the network I/O signals through a midplane circuit board,
wherein providing the network I/O signals from the transition card to the spare network card is done via the midplane circuit board,
wherein the enabling of the spare network card from an inactive state after detecting a failure in the first network card occurs within a time that is small enough to not allow a loss of frame error to occur.

8. A method of improving network reliability comprising:
employing a spare card in a chassis along with multiple active cards;
detecting a failed network card in the multiple active cards;
automatically routing I/O signals from a transition card associated with the failed network card to the spare card;
enabling the spare card,
wherein the enabling of the spare card and the automatically routing I/O signals through the chassis to the spare card allow the spare card to resume network operations within one frame period.

9. A method of improving network reliability comprising:
employing a spare card in a chassis along with multiple active cards;
detecting a failed network card in the multiple active cards;
automatically routing I/O signals from a transition card associated with the failed network card to the spare card;
enabling the spare card;
employing a second spare card in the chassis along with the multiple active cards; and
enabling the second spare card when a second of the multiple active cards fails,
wherein the enabling of the second spare card and the automatically routing signals through the chassis to the spare card allow the spare card to service the network within one frame period.

10. A method of improving network reliability comprising:
employing a spare card in a chassis along with multiple active cards;
detecting a failed network card in the multiple active cards;
automatically routing I/O signals from a transition card associated with the failed network card to the spare card;
enabling the spare card,
wherein the enabling of the spare card allows a suspension in network services of less than one frame period.

* * * * *